(12) United States Patent
Schroeder et al.

(10) Patent No.: US 9,379,591 B2
(45) Date of Patent: Jun. 28, 2016

(54) MOTOR WITH INTEGRATED COUPLER

(71) Applicant: Pacific Bearing Company, Rockford, IL (US)

(72) Inventors: Robert Schroeder, Machesney Park, IL (US); Jonathan R. Schroeder, Machesney Park, IL (US); Joseph A. Binka, Belvidere, IL (US)

(73) Assignee: Pacific Bearing Company, Rockford, IL (US)

( * ) Notice: Subject to any disclaimer, the term of this patent is extended or adjusted under 35 U.S.C. 154(b) by 0 days.

(21) Appl. No.: 14/415,703

(22) PCT Filed: Jul. 19, 2013

(86) PCT No.: PCT/US2013/051190
§ 371 (c)(1),
(2) Date: Jan. 19, 2015

(87) PCT Pub. No.: WO2014/015209
PCT Pub. Date: Jan. 23, 2014

(65) Prior Publication Data
US 2015/0236562 A1    Aug. 20, 2015

Related U.S. Application Data

(60) Provisional application No. 61/673,622, filed on Jul. 19, 2012.

(51) Int. Cl.
*H02K 7/00* (2006.01)
*H02K 41/02* (2006.01)

(52) U.S. Cl.
CPC .............. *H02K 7/003* (2013.01); *H02K 41/02* (2013.01)

(58) Field of Classification Search
CPC ......................... H02K 41/02; H02K 7/003
See application file for complete search history.

(56) References Cited

U.S. PATENT DOCUMENTS

| | | | |
|---|---|---|---|
| 5,747,896 A | 5/1998 | Nagai et al. | |
| 6,362,547 B1 * | 3/2002 | Peterson | H02K 21/14 310/12.14 |
| 6,603,229 B1 * | 8/2003 | Toye, IV | H02K 7/06 128/205.24 |
| 6,841,912 B2 * | 1/2005 | Yamada | F04D 25/0606 310/156.11 |
| 2009/0261671 A1 | 10/2009 | Hochhalter et al. | |

FOREIGN PATENT DOCUMENTS

| | | |
|---|---|---|
| JP | 07-007885 | 1/1995 |
| JP | 2008-254656 | 10/2008 |
| JP | 2009-270709 | 11/2009 |
| JP | 2011-19394 | 1/2011 |

* cited by examiner

*Primary Examiner* — Dang Le
(74) *Attorney, Agent, or Firm* — Reinhart Boerner Van Deuren P.C.

(57) ABSTRACT

Couplings between driven shafts of an actuator and a motor of an actuator are provided. The coupling may be directly integrated into a rotor of the motor. The coupling may be provided by an adaptor that includes a shaft that extends into a central bore of the rotor of the motor. The adaptor can include a collar that defines a coupling recess that receives a distal end of the driven shaft of the actuator. The collar may take the form of a clamp.

10 Claims, 10 Drawing Sheets

MOTOR WITH INTEGRATED COUPLER

FIELD OF THE INVENTION

This invention generally relates to the connection between a motor and a shaft or screw that is driven by the motor.

BACKGROUND OF THE INVENTION

Many applications couple a motor to a shaft, which may take the form of a drive screw to transfer the rotary motion of the motor to another device, such as a carriage of a linear actuator that is driven by the screw.

Figure 12:
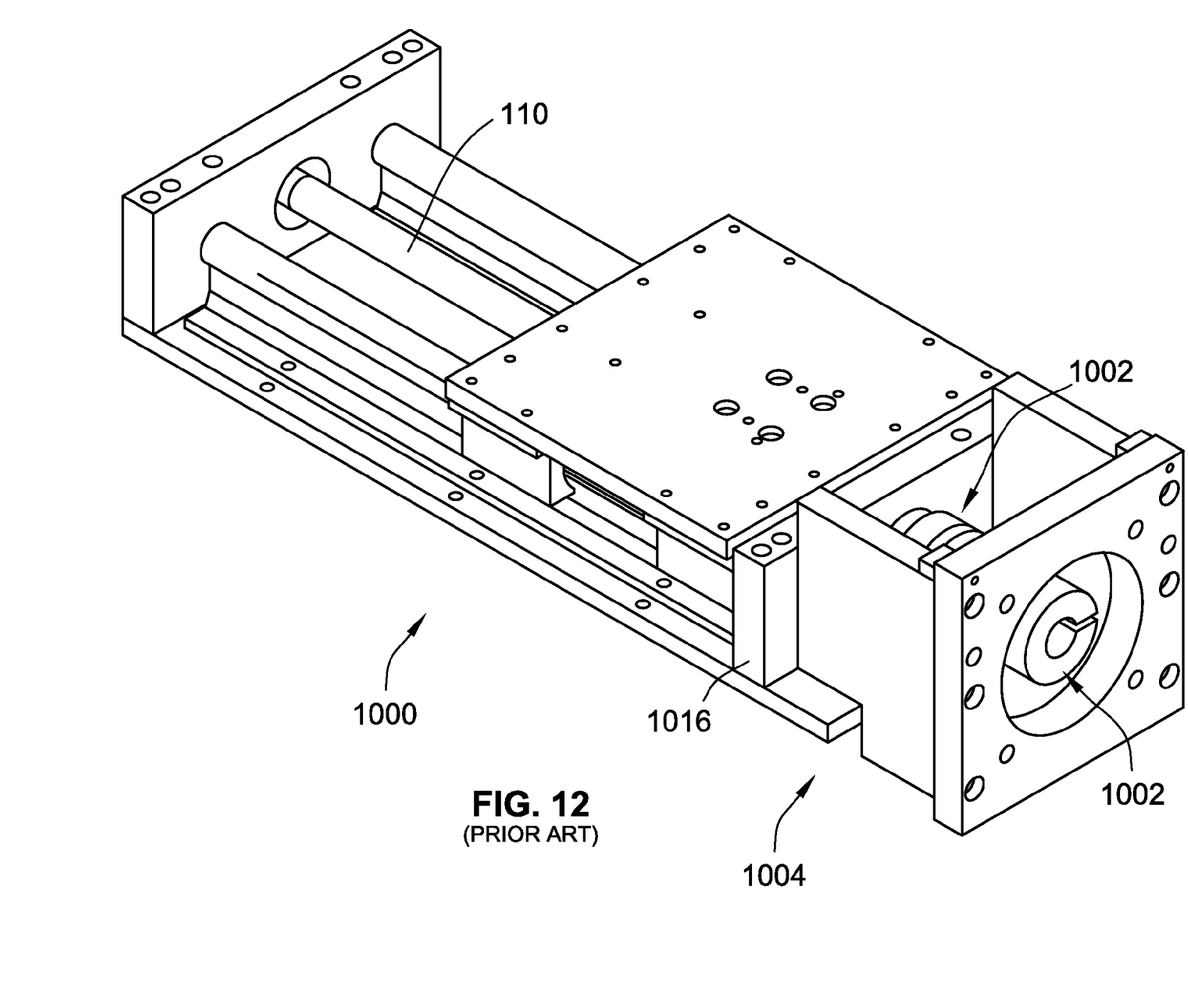
FIG. 12 is a prior art design.

Existing motor and screw combinations offer a variety of assembly and stocking problems. With reference to FIG. 12, a conventional linear actuator 1000 takes a screw 1010 and a standard journal and attaches them with a coupler 1002. For instance, an output shaft of the motor (not shown) will be co-axially aligned with the rotational axis of the screw 1010. The coupler 1002 will be attached to the adjacent ends of the output shaft and the screw.

Unfortunately, with this method, a motor mount 1004 is interposed between the end block 1016 of the actuator and the motor to space the motor away from the end block 1016 of the actuator to accommodate the coupler 1002. This causes undesirable excess length to the overall system.

Alternative coupling methods have been proposed to attempt to shorten the overall length of the system. For instance, in one application, the shaft of the screw is directly welded to the motor. This does shorten the overall length of the system but makes the motor/shaft combination custom for each system based on the length, causing stocking and replacement part difficulties.

It is therefore desirable to provide a system that uses a coupler arrangement but at an overall shorter length for the complete system.

BRIEF SUMMARY OF THE INVENTION

Embodiments of the present invention provide ways to shorten the length of actuators by reducing the length of the coupling between the motor and the screw thereof.

In one embodiment, a driven shaft, such as a screw, and motor combination is provided. The combination includes a driven shaft having a connection end and a motor having a coupling recess receiving the connection end. The connection end and the coupling recess configured to transfer rotational motion of a rotor of the motor to rotational motion of the driven shaft. The driven shaft may be a screw of an actuator.

In one embodiment, an adaptor for coupling a connection end of a driven shaft of an actuator to a motor having a central bore extending into a rotor of the motor is provided. The adaptor includes a coupling shaft and a collar at one end of the shaft. The collar has a coupling recess, which may be in some embodiments, co-axial with the coupling shaft. The coupling recess is configured for engagement with a connection end of the screw.

In one embodiment, the collar is a split collar that forms a clamp such that the diameter of the coupling recess can be adjusted to clamp onto the end of the driven shaft.

In one embodiment, the coupling recess includes a non-round section to allow for improved torque transmission.

In one embodiment, the non-round section is one of hexagonal, octagonal, rectangular, triangular, half-shaft, crescent shaped, or tapered.

In another embodiment, a driven shaft and motor combination is provided. The driven shaft has a connection end. The motor has a central bore in the rotor thereof that is coaxial with an axis about which the rotor rotates. An adaptor couples the connection end of the driven shaft to the rotor of the motor. The adaptor includes a coupling shaft sized to be received into the central bore and a collar at one end of the coupling shaft. The collar has a coupling recess that is configured to engage the connection end of the driven shaft to transfer rotational motion of the rotor to the screw.

In one embodiment, the collar is a split collar forming a clamp arrangement that can adjust the size of the coupling recess.

In one embodiment, the coupling recess includes a non-round section.

In one embodiment, the non-round section is one of hexagonal, octagonal, rectangular, triangular, half-shaft, crescent shaped, or tapered.

In one embodiment, an outer periphery of the coupling shaft of the adaptor is knurled to improve engagement with the central bore of the rotor.

In one embodiment, the adaptor is removable from the rotor.

In one embodiment, the adaptor is welded to the rotor.

In one embodiment, a distal end of the coupling shaft of the adaptor opposite the collar extends axially out of the motor.

Another embodiment provides a linear actuator. The linear actuator includes a guide arrangement including a guide track. A carriage is mounted to the guide track for motion along the guide track. A driven shaft is operably coupled to the carriage for converting rotary motion of the screw to linear motion of the carriage along the guide track. The driven shaft has a connection end. The linear actuator includes a motor having a central bore in the rotor thereof that is coaxial with an axis about which the rotor rotates. The linear actuator includes an adaptor for coupling the connection end of the driven shaft to the rotor of the motor. The adaptor includes a coupling shaft sized to be received into the central bore and a collar at one end of the coupling shaft. The collar has a coupling recess that is configured to engage the connection end of the driven shaft to transfer rotational motion of the rotor to the screw.

In one embodiment, the guide arrangement includes an end block at one end of the guide track. The connection end of the driven shaft extends axially beyond the end block. The motor is operably attached to the end block, the engagement between the collar and the connection end being within the motor.

In one embodiment, the motor includes an end plate that is directly mounted to the end block. The end plate defines an aperture in which the collar of the connector is positioned.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
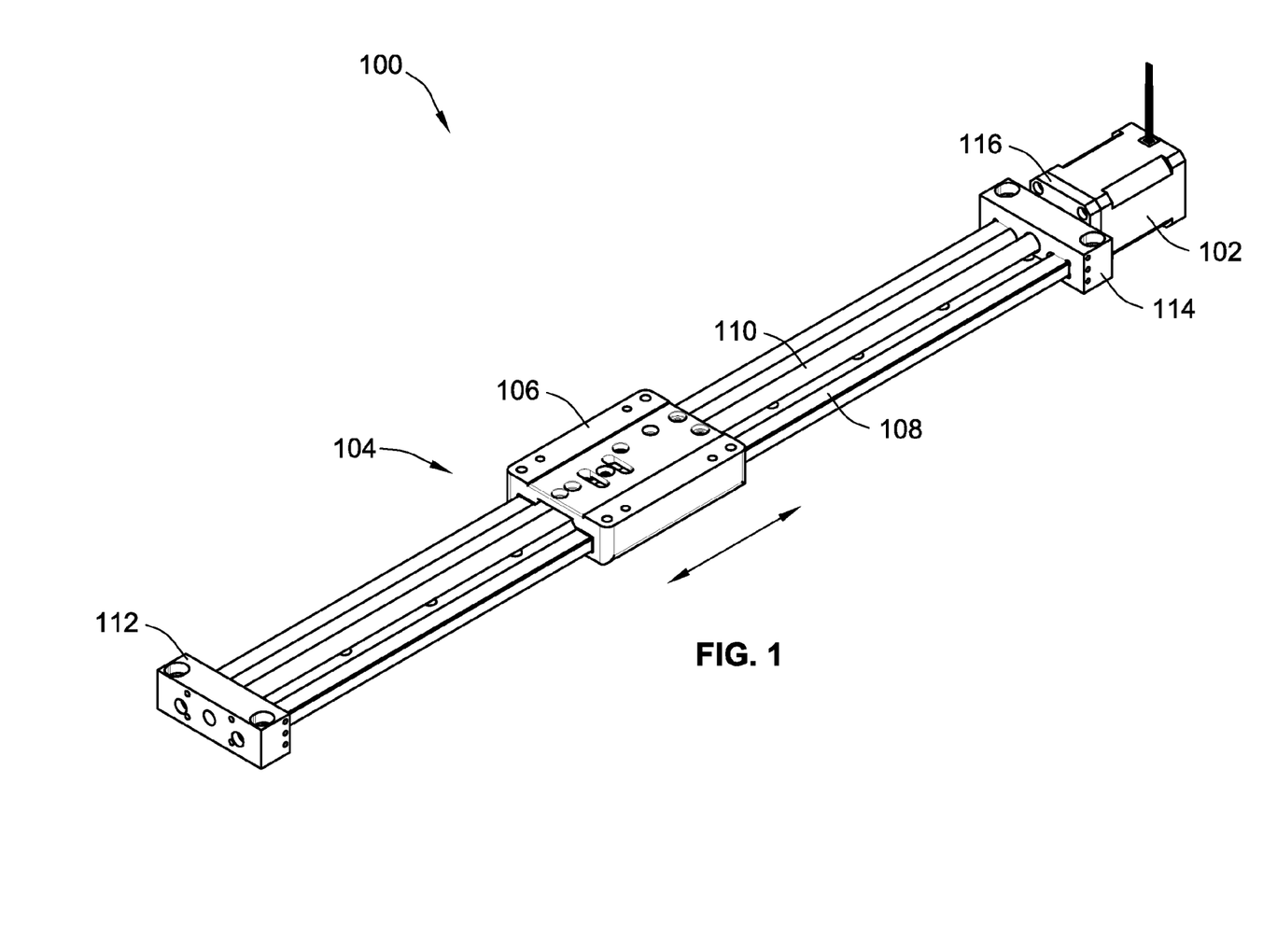
FIG. 1 is a linear actuator according to an embodiment of the present invention.

FIG. 1 illustrates a linear actuator 100 according to an embodiment of the present invention. The linear actuator 100 generally includes a motor 102 operably coupled to a guide arrangement 104 to drive a carriage 106 of the guide arrangement 104 for reciprocating motion along a guide track 108 of the guide arrangement 108.

The linear actuator 100 includes a driven shaft in the form of screw 110 that is operably attached to the motor 102 and operably attached to the carriage 106. The guide arrangement 104 converts the rotational motion of the screw 110 and motor 102 into linear motion of the carriage 106.

The guide arrangement 104 includes a pair of end blocks 112, 114 operably attached to opposed ends of the guide track 108. End block 112 rotationally supports one end of the screw 110 while end block 114 rotationally supports the other end of the screw 110. These ends may be supported by bearings, bushings or other structures to reduce friction between the screw 110 and the end blocks 112, 114.

The motor 102 and particularly end plate 116 of the motor 102 is directly attached to end block 114.

Figure 2:
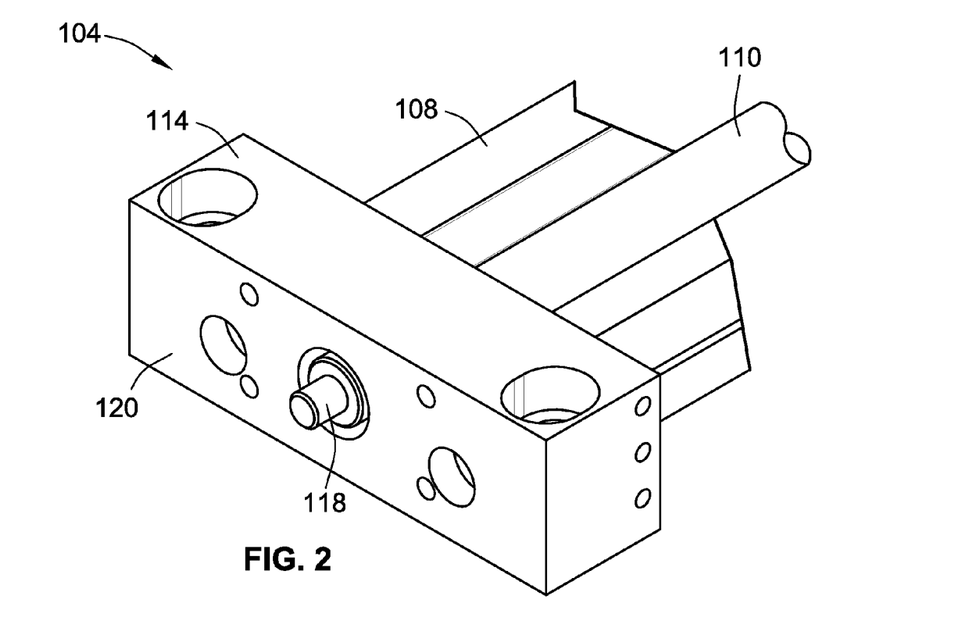
FIG. 2 is a perspective illustration of an end of the guide arrangement of the actuator of FIG. 1.
Figure 3:
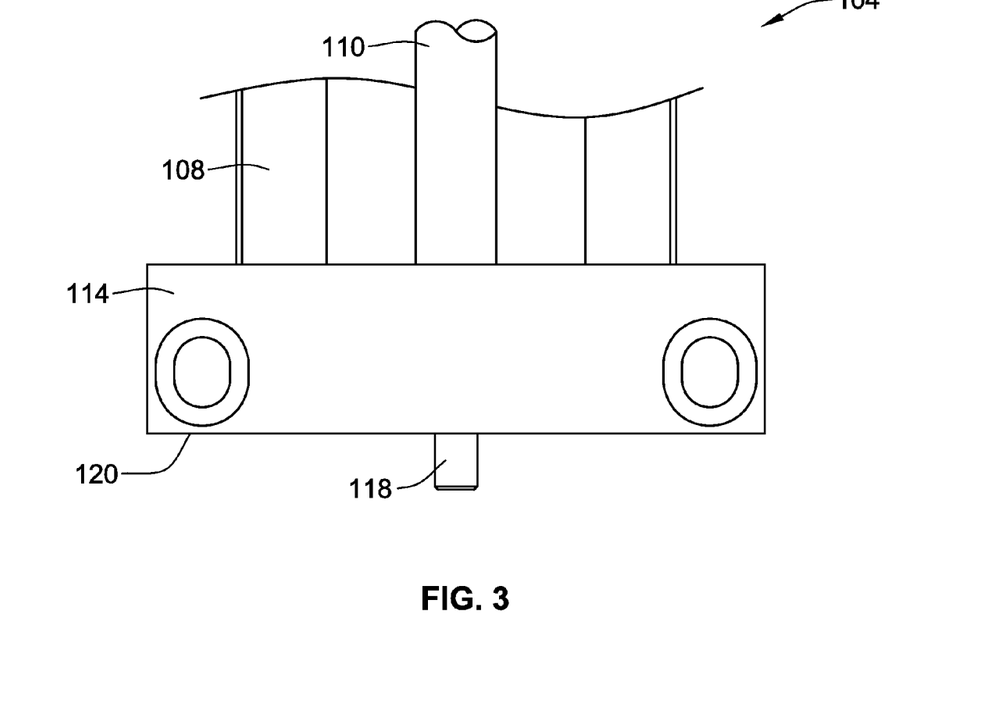
FIG. 3 is a top illustration of the end of FIG. 2.

FIGS. 2 and 3 illustrate the end of the guide arrangement 104 that includes end block 114. The screw 110, at this end, includes a reduced diameter connection end 118 that extends axially outward beyond an end face 120 of end block 114. The motor 102 operably attaches to the connection end 118.

Figure 4:
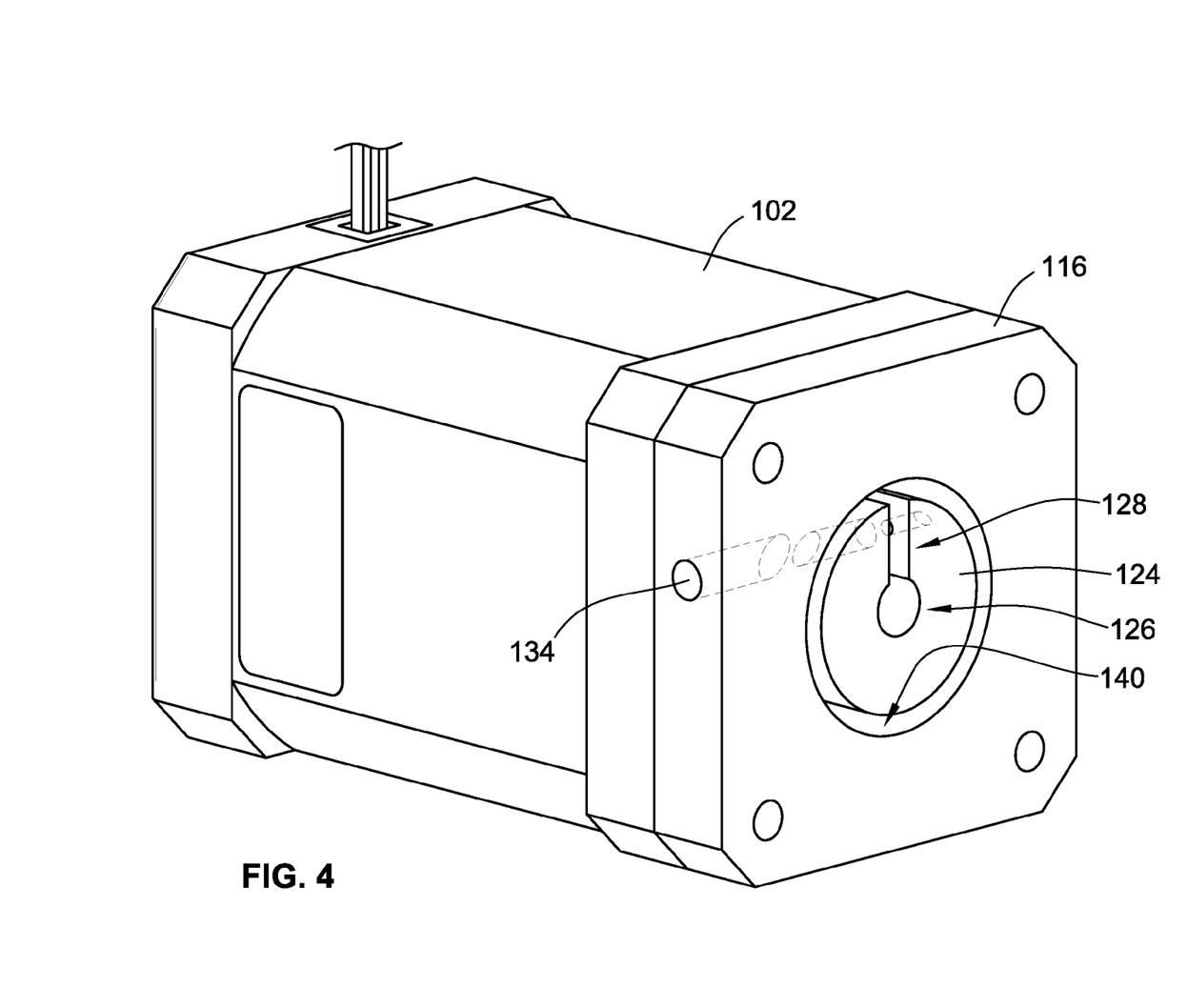
FIG. 4 is a perspective end illustration of the motor of the linear actuator of FIG. 1.
Figure 5:
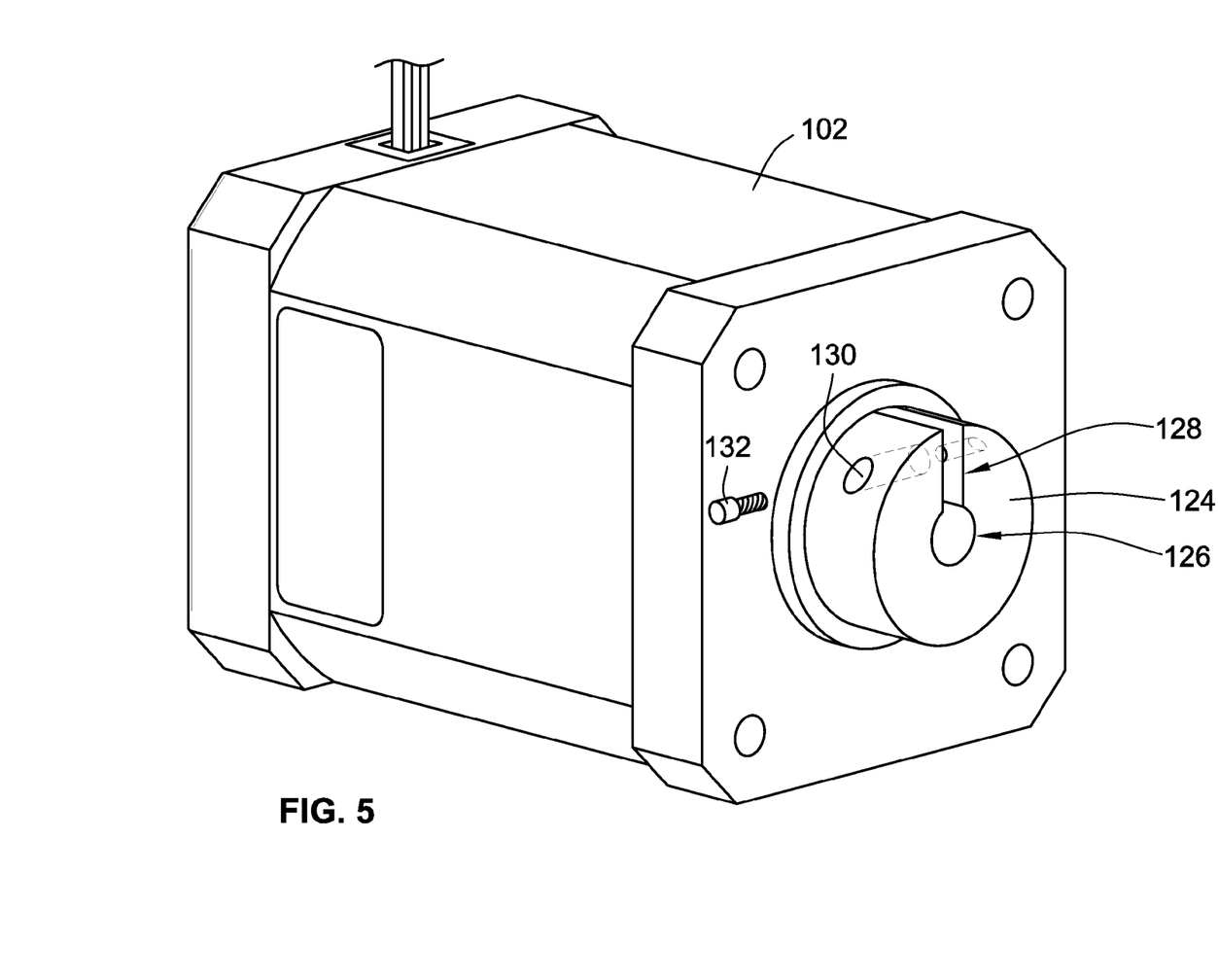
FIG. 5 is a perspective end illustration of the motor of FIG. 4 with an end plate thereof removed.

FIGS. 4 and 5 illustrate the motor 102 removed from the guide arrangement 104. The motor 102 includes a collar 124 that defines a cylindrical coupling recess 126 sized to receive the connection end 118 of the screw 110. The collar is used to compensate for misalignment between the screw 110 and the rotor of the motor. The collar 124 is a split collar that includes a slot 128 configured to allow for adjustment of the size of the coupling recess 126 to allow the collar 124 to be clamped around the outer periphery of the connection end 118 of the screw 110. The collar 124 includes a through aperture 130 that operably receives and cooperates with a bolt 132 to adjust the tightness of collar 124 around connection end 118. End plate 116 of the motor 102 may also include such a through aperture 134 for receipt of a tool, such as a screw driver or Allen wrench for adjusting the bolt 132.

In this embodiment, the collar 124 is directly integrated into the motor 102 such that it is formed as part of the rotor of the motor 102 as a single piece.

Figure 6:
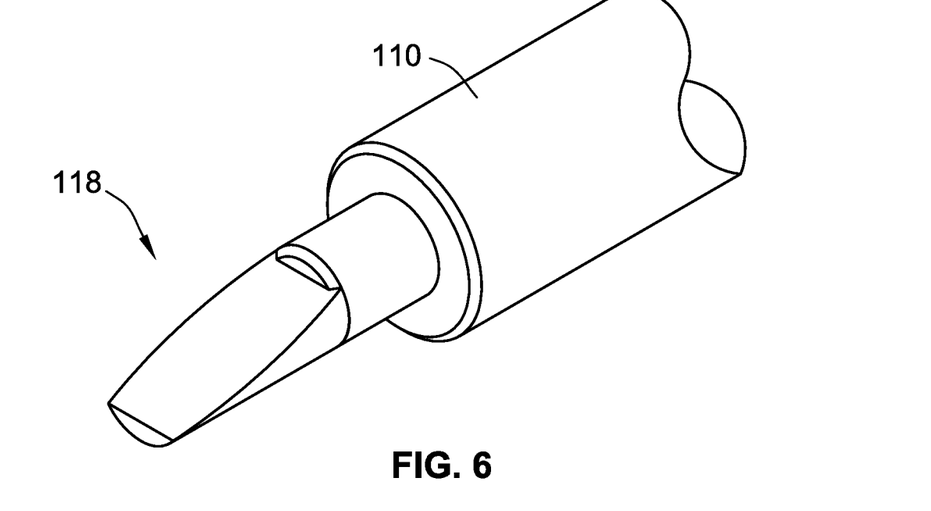
FIGS. 6 and 7 are alternative connection ends for screws that can be used in the linear actuator of FIG. 1.
Figure 7:
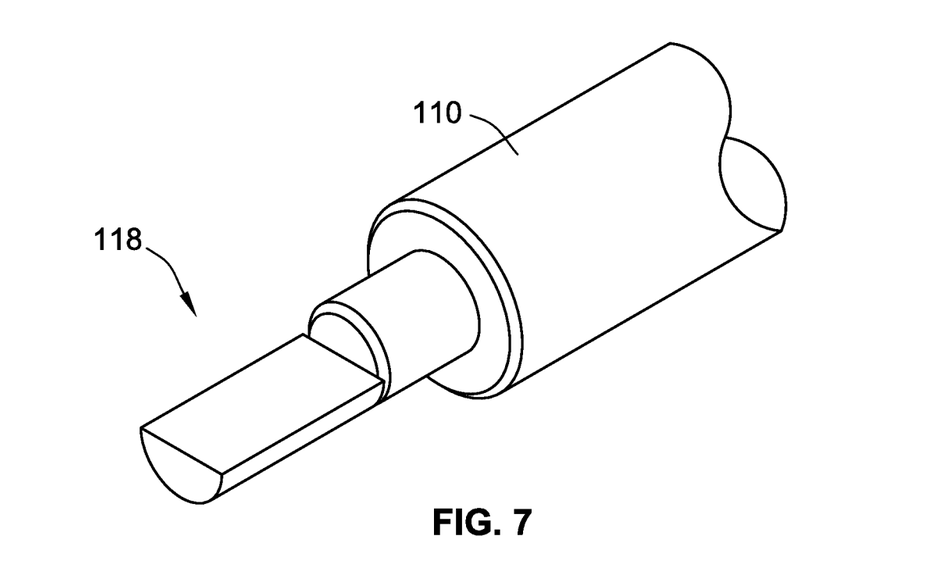

In other embodiments, the collar 124 need not be a split collar but could be provided with a keyed arrangement with the end of the screw 110 of the guide arrangement 104. For instance, the coupling recess 126 could be internally splined and the outer periphery of the connection end 118 could have a cooperating spline. In one embodiment, the connection end 118 of screw 110 is wedge shaped, and the coupling recess 126 has a corresponding taper to mate with the wedge shape of the connection end 118 (see FIG. 6). Other shapes could include a crescent, hexagonal, octagonal, rectangular, the shaft could be cut in half at the connection end 118 to reveal a flat (see FIG. 7), etc. Further, in some embodiments, the outer periphery of the connection end 118 could be knurled and press fit into the coupling recess 126.

With reference to FIG. 4, the collar 124 is located within an enlarged bore or aperture formed in the end plate 116 of the motor. As such, the connection end of the screw 110 is received into the motor 102 thereby reducing the overall length of the linear actuator 100.

Further, by using the collar arrangement, the collar can be released from screw 110 so that it can be adapted to be used with various different screws as well as to allow for easy removal and replacement of either the motor or the screw 110.

Figure 8:
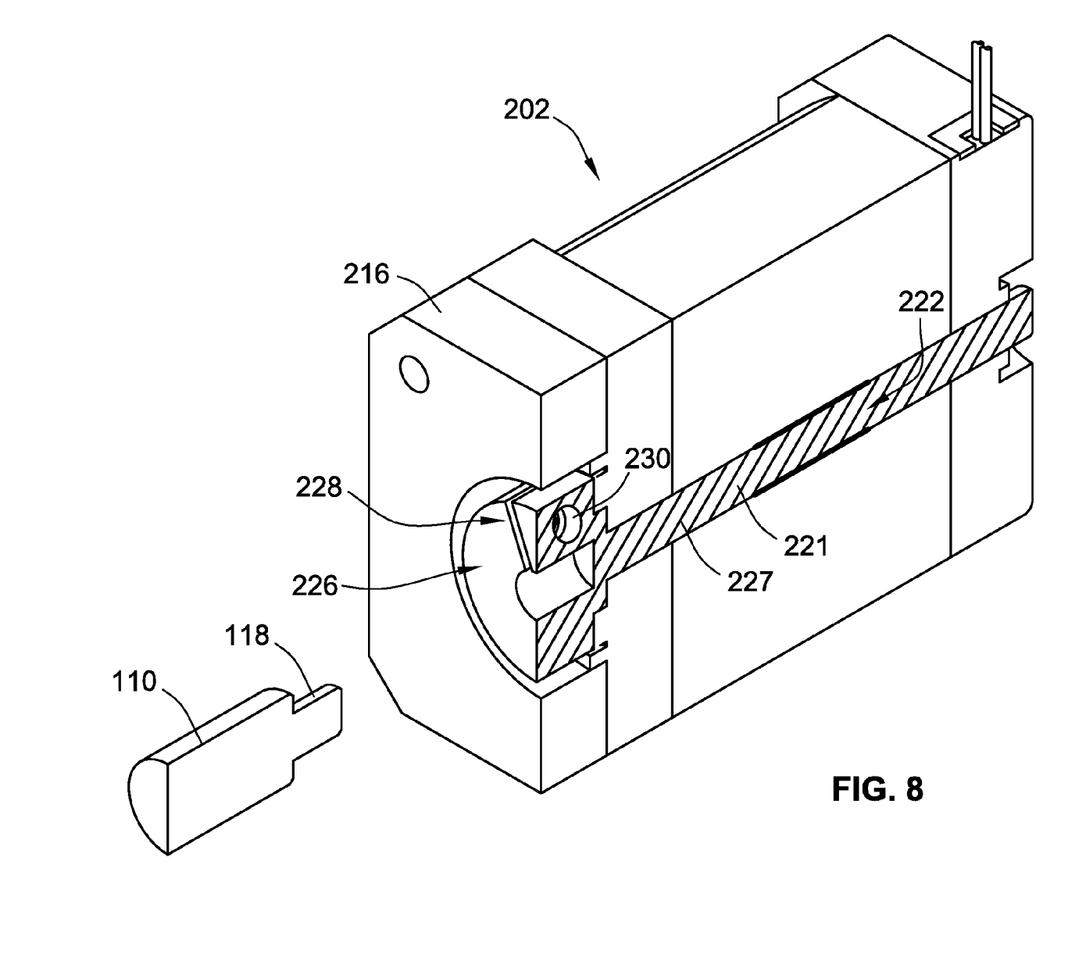
FIG. 8 is an alternative embodiment of a motor and adaptor for use in a linear actuator according to the teachings of the invention.
Figure 9:
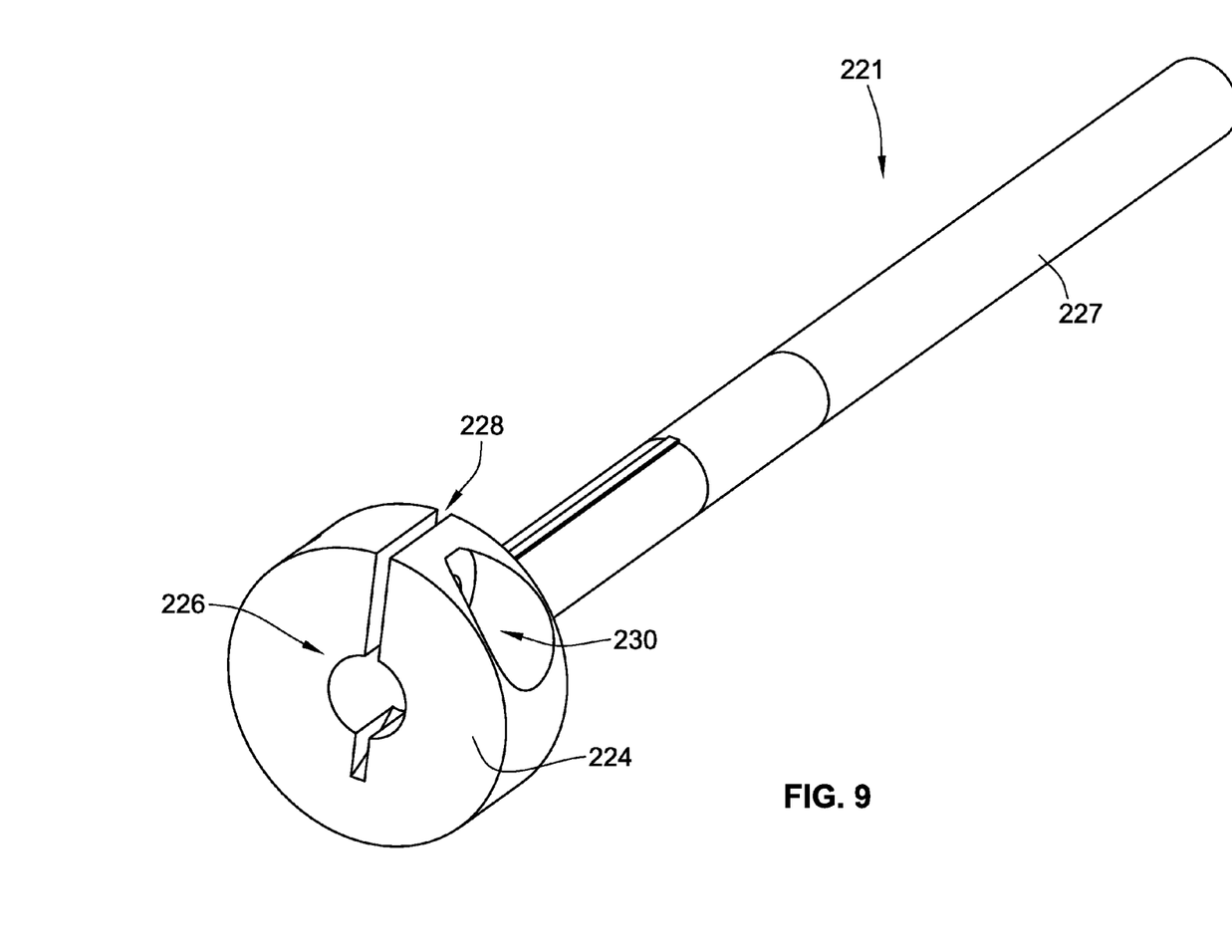
FIGS. 9 and 10 are illustrations of the adaptor of FIG. 8.

FIG. 8 illustrates a further embodiment. In this embodiment, the motor 202 does not include an integrated collar. Instead, the system includes an adaptor 221 that is received into a central bore 222 that passes through the center of the motor 202 and particularly a rotor thereof.

The adaptor 221 include a collar 224 that is split collar that functions like the split collar described with regard to prior embodiments. The collar 224 is located within an aperture formed in an end plate 216 of the motor 202. Further, the collar 224 is unitarily formed as a single piece with a coupling shaft 227 of the adaptor 221.

Figure 10:
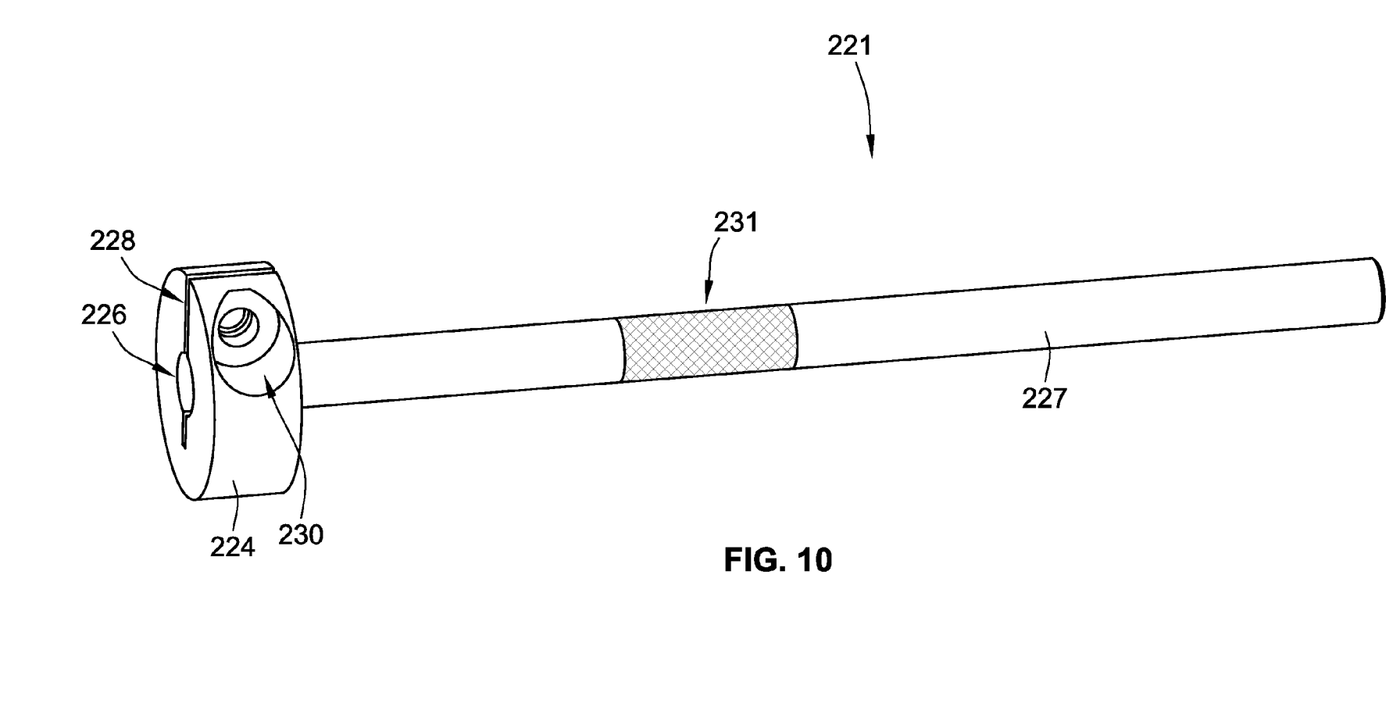

The outer periphery of the coupling shaft 227 can be knurled (such as at area 231 in FIG. 10) and press fit into engagement with the inner surface defining central bore 222. Again, the collar 224 defines a coupling recess 226 for receipt of connection end 118 of screw 110. Again, the collar 224 includes a 128 as well as a through aperture 130 such that the collar 224 can function as a clamp for engaging the connection end 118 of screw 110.

The coupling recess 126 of the adaptor 221 could take any of the shapes identified above. Further, the outer periphery of the coupling shaft 227 of the adaptor 221 could take other shapes other than round. Again, it could be rectangular, triangular, oval, crescent shaped, split shaft shaped, hexagonal, octagonal, etc. with the bore 222 of the rotor taking the same shape. Further, for all embodiments, pinned connections could also be used where the pin extends through the collar as well as the connection end of the screw.

Figure 11:
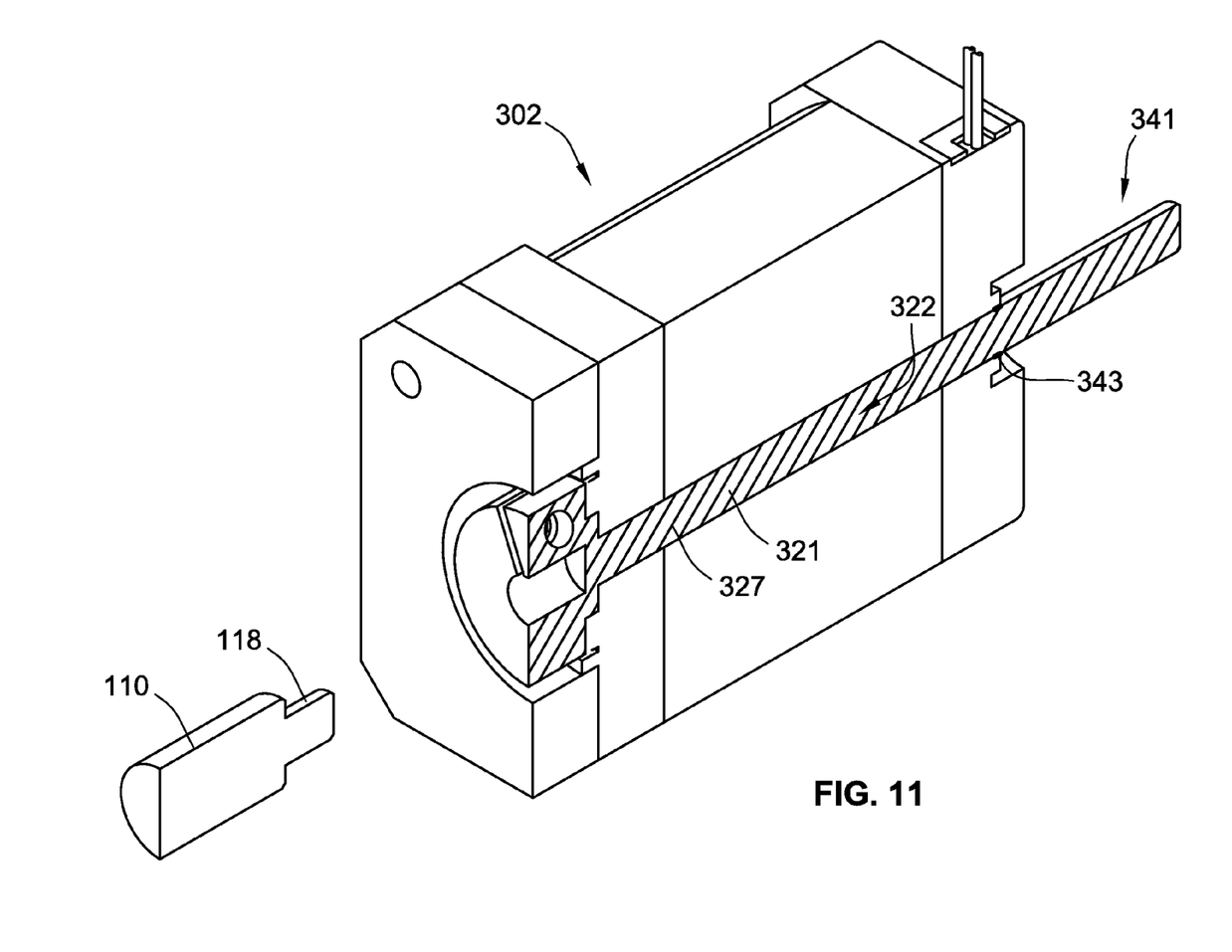
FIG. 11 is a further embodiment of a motor and adaptor for use in a linear actuator according to the teachings of the invention.

FIG. 11 illustrates a further embodiment. This embodiment is similar to the prior embodiment and the motor 302 receives an adaptor 321 into a bore 322 of the rotor thereof. However, in this embodiment, the coupling shaft 327 of the adaptor extends axially outward beyond a rear end of the motor 302. As such, a distal end portion 341 of the coupling shaft 327 extends out of the rear end of motor 302. In this embodiment, the coupling shaft 327 is welded to the rotor at weld 343. However, unlike prior art embodiments where a weld exists, the adaptor 321 still includes the collar 324 that the motor 302 can be easily released from the screw 110.

In further embodiments, the distal end portion 341 need not be welded to the rotor and the exposed distal end portion 341 could be used to attach additional devices such as a brake, encoder, flywheel, gear, pulley, etc.

The adaptors 221, 321 of the prior embodiments may be referred to as clamp shafts.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A driven shaft and motor combination comprising:
   a driven shaft having a connection end; and
   a motor having a central bore in the rotor thereof that is coaxial with an axis about which the rotor rotates; and
   an adaptor for coupling the connection end of the driven shaft to the rotor of the motor, the adaptor including a coupling shaft sized to be received into the central bore and a collar at one end of the coupling shaft, the collar having a coupling recess configured to engage the connection end to transfer rotational motion of the rotor to rotational motion of the driven shaft; and
   wherein the collar is a split collar forming a clamp arrangement that can adjust the size of the coupling recess.

2. The driven shaft and motor combination of claim 1, wherein the coupling recess includes a non-round section.

3. The driven shaft and motor combination of claim 2, wherein the non-round section is one of hexagonal, octagonal, rectangular, triangular, half-shaft, crescent shaped, or tapered.

4. The driven shaft and motor combination of claim 1, wherein an outer periphery of the coupling shaft of the adaptor is knurled.

5. The driven shaft and motor combination of claim 1, wherein the adaptor is removable from the rotor.

6. The driven shaft and motor combination of claim 1, wherein the adaptor is welded to the rotor.

7. The driven shaft and motor combination of claim 1, wherein a distal end of the coupling shaft of the adaptor opposite the collar extends axially out of the motor.

8. A linear actuator comprising:
   a guide arrangement including a guide track, a carriage mounted to the guide track for motion along the guide track, a driven shaft operably coupled to the carriage for converting rotary motion of the driven shaft to linear motion of the carriage along the guide track, the driven shaft having a connection end; and
   a motor having a central bore in the rotor thereof that is coaxial with an axis about which the rotor rotates; and
   an adaptor for coupling the connection end of the driven shaft to the rotor of the motor, the adaptor including a coupling shaft sized to be received into the central bore and a collar at one end of the coupling shaft, the collar having a coupling recess configured to engage the connection end to transfer rotational motion of the rotor to the driven shaft.

9. The linear actuator of claim 8, wherein the guide arrangement includes an end block at one end of the guide track, the connection end of the driven shaft extending axially beyond the end block, the motor being operably attached to the end block, the engagement between the collar and the connection end being within the motor.

10. The linear actuator of claim 9, wherein the motor includes an end plate that is directly mounted to the end block, the end plate defining an aperture in which the collar of the connector is positioned.

* * * * *